(12) United States Patent
Fukumoto

(10) Patent No.: US 6,529,335 B2
(45) Date of Patent: Mar. 4, 2003

(54) EYEPIECE LENS SYSTEM, TELESCOPE, BINOCULAR, AND MICROSCOPE

(75) Inventor: Satoshi Fukumoto, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/824,216

(22) Filed: Apr. 3, 2001

(65) Prior Publication Data

US 2001/0036019 A1 Nov. 1, 2001

(30) Foreign Application Priority Data

Apr. 4, 2000 (JP) .......................... 2000-101738

(51) Int. Cl.$^7$ .................. G02B 25/00; G02B 13/18
(52) U.S. Cl. ................. 359/646; 359/643; 359/717
(58) Field of Search ............... 359/643–647, 359/717, 718, 648, 793, 661, 374–376, 399, 407

(56) References Cited

U.S. PATENT DOCUMENTS 5,400,182 A * 3/1995 Chiba .................... 264/1.7
5,764,418 A * 6/1998 Sato et al. .................. 359/646

OTHER PUBLICATIONS

Patent Abstracts of Japan, Ito Takayuki, et al., "Composite Type Aspheric Lens and Lens System Including Composite Type Aspheric Lens", Dec. 7, 1993.

Patent Abstracts of Japan, Ito Takayuki, et al., Lens System Including Compound Type Aspherical Surface Lens, Dec. 7, 1993.

* cited by examiner

*Primary Examiner*—Evelyn A Lester

(57) ABSTRACT

An eyepiece lens system using an aspherical lens can be formed at a low cost, having an eye relief equivalent to 80% or more of the focal length of the entire eyepiece lens system, with aberrations satisfactorily corrected up to the circumference of the field of view, as well as a telescope, a binocular and a microscope. The eyepiece lens system comprises a cemented lens and a positive lens, and at least one of the lens surfaces is formed aspherical. The aspherical surface is a hybrid type spherical surface formed by applying a synthetic resin layer on a basic spherical surface made of glass. There are also provided a telescope, a binocular and a microscope employing such eyepiece lens system.

18 Claims, 11 Drawing Sheets

EYEPIECE LENS SYSTEM, TELESCOPE, BINOCULAR, AND MICROSCOPE

This application claims the benefit of Japanese Patent Application No. 2000-101738 which is hereby incorporated by reference.

BACKGROUND OF THE INVENTION

1. Field of the Invention

The present invention relates to an eyepiece lens system which is used in an observation optical system for a binocular, a telescope, or a microscope, as well as to a binocular, a telescope, and a microscope employing such an eyepiece lens system.

2. Related Background Art

In case of an eyepiece lens to be used in an observation optical system, it is required to provide an eye relief having the sufficient length in order to easily observe the entire field of view. However, in case of a general eyepiece lens system, there is a tendency that the shorter the focal length of the lens system is, the larger a sum of the refractive power of the lens surfaces for constituting the optical system. As a result, aberrations typically including a curvature of field are deteriorated. Also, in case of the general eyepiece lens system, the eye relief can be often obtained in the size of only 80% or around of the focal length. As a result, it is impossible to obtain a sufficient eye relief in an eyepiece lens having a small focal length.

Furthermore, in case of the general eyepiece lens, when an apparent field of view is enlarged while maintaining excellent aberrations even up to the circumference of the field of view, the eye relief becomes short. On the other hand, when the eye relief is lengthened while maintaining a fixed apparent field of view, the diameter of the eyepiece lens is increased, thereby deteriorating the aberrations on the circumference of the field of view.

A distortion especially has a tendency to increase in proportion to the size of the apparent field of view. Thus, it is very difficult to enlarge the apparent field of view and the eye relief at the same time since it is difficult to correct this distortion satisfactorily by the use of a lens system which is generally formed only by spherical surfaces.

Consequently, in order to solve these problems mentioned above, there have been proposed a technology which employs an aspherical surface in an eyepiece lens system.

As a technology for forming an aspherical form on a lens surface, there has been proposed fine grinding, or polishing, or a use of an aspherical mold lens.

However, fine grinding and polishing take a lot of time for forming the aspherical form, which may easily result in increase in the processing cost. Also, when a mold lens is to be produced, there arise a large number of restrictions on the material, the form, and the like of the lens by these methods, which undesirably lower the degree of freedom in the optical design.

SUMMARY OF THE INVENTION

Accordingly, an object of the present invention is to provide an eyepiece lens system which employs an aspherical lens having a few restrictions on optical designing to be formed at a low cost, in which an eye relief is long enough to be equivalent to 80% or more of the focal length of the eyepiece lens system with the aberrations, particularly a distortion, excellently corrected even up to the circumference of the field of view.

Another object of the present invention is to provide a telescope, a binocular, and a microscope capable of observing an object to be observed as an excellent image by using such an eyepiece lens system as described above.

In order to achieve the above objects, according to the present invention, there is provided an eyepiece lens system which comprises a cemented lens and a positive lens, and in which at least one of the lens surfaces is formed aspherical, and this aspherical surface is of a hybrid type formed by applying a synthetic resin layer on a basic spherical surface made of glass.

Also, according to the present invention, there are provided a telescope, a binocular as well as a microscope employing such an eyepiece lens system as described above.

DETAILED DESCRIPTION OF THE PREFERRED EMBODIMENT

Figure 1:
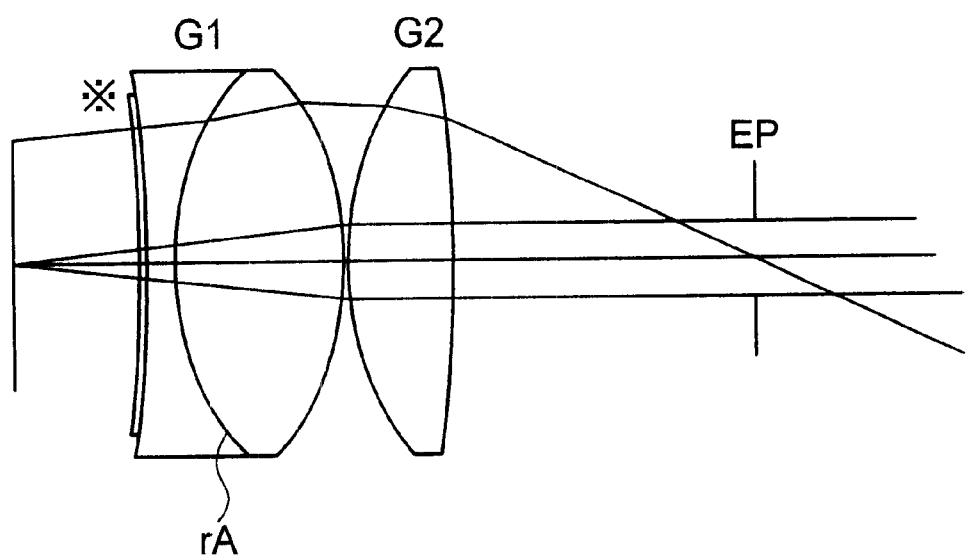
FIG. 1 is a view for showing the configuration of Example 1 of the present invention.
Figure 2:
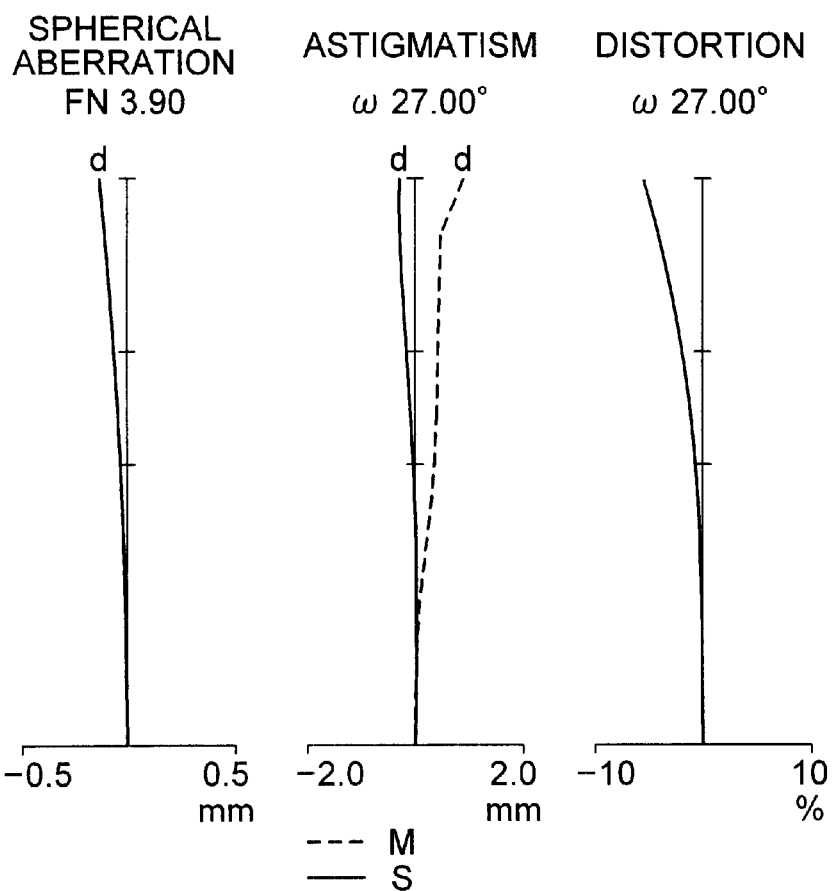
FIG. 2 is an aberration view of Example 1 of the present invention.
Figure 3:
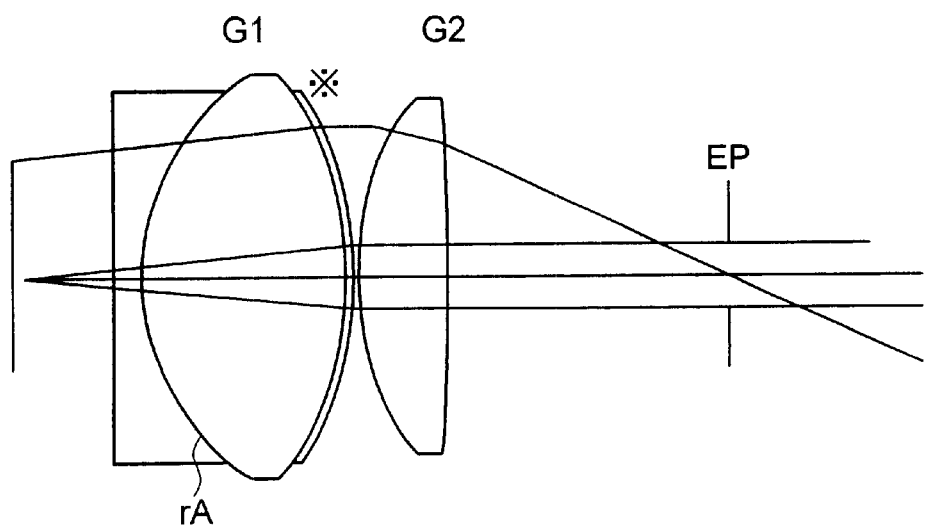
FIG. 3 is a view for showing the configuration of Example 2 of the present invention.
Figure 4:
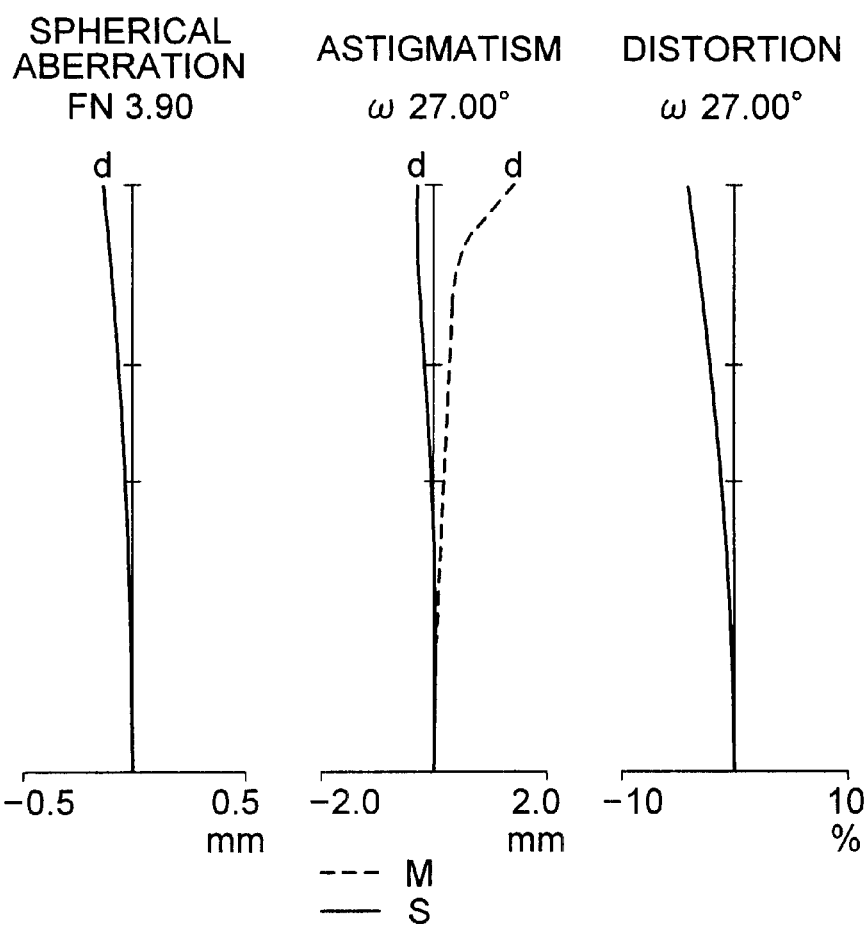
FIG. 4 is an aberration view of Example 2 of the present invention.
Figure 5:
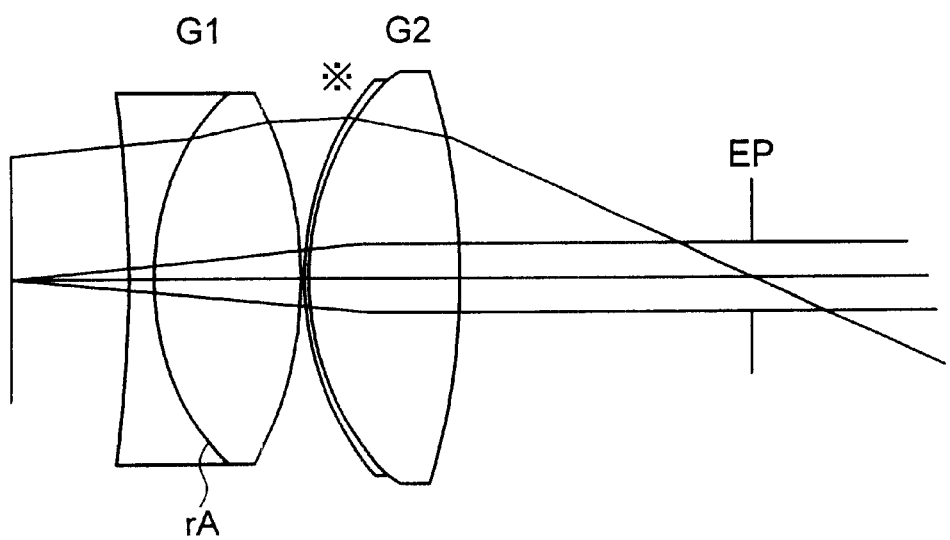
FIG. 5 is a view for showing the configuration of Example 3 of the present invention.
Figure 6:
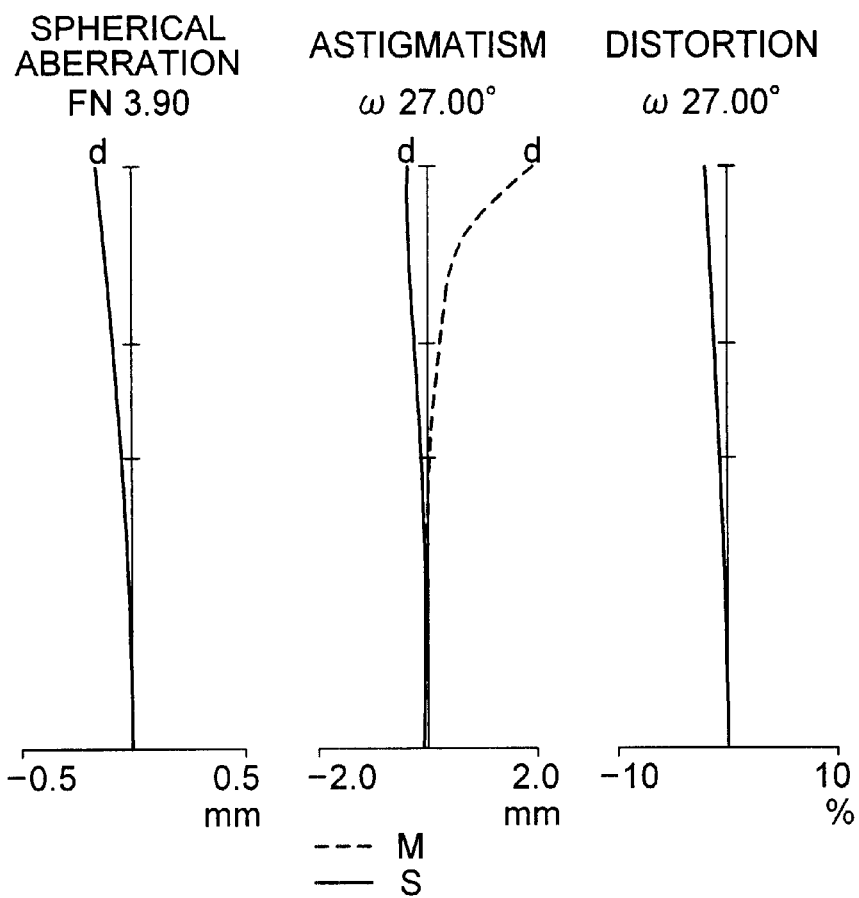
FIG. 6 is an aberration view of Example 3 of the present invention.
Figure 7:
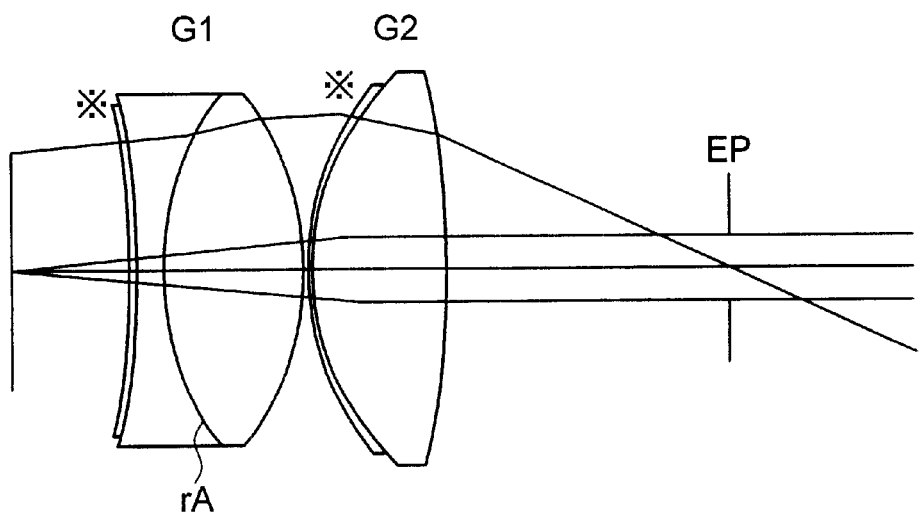
FIG. 7 is a view for showing the configuration of Example 4 of the present invention.
Figure 8:
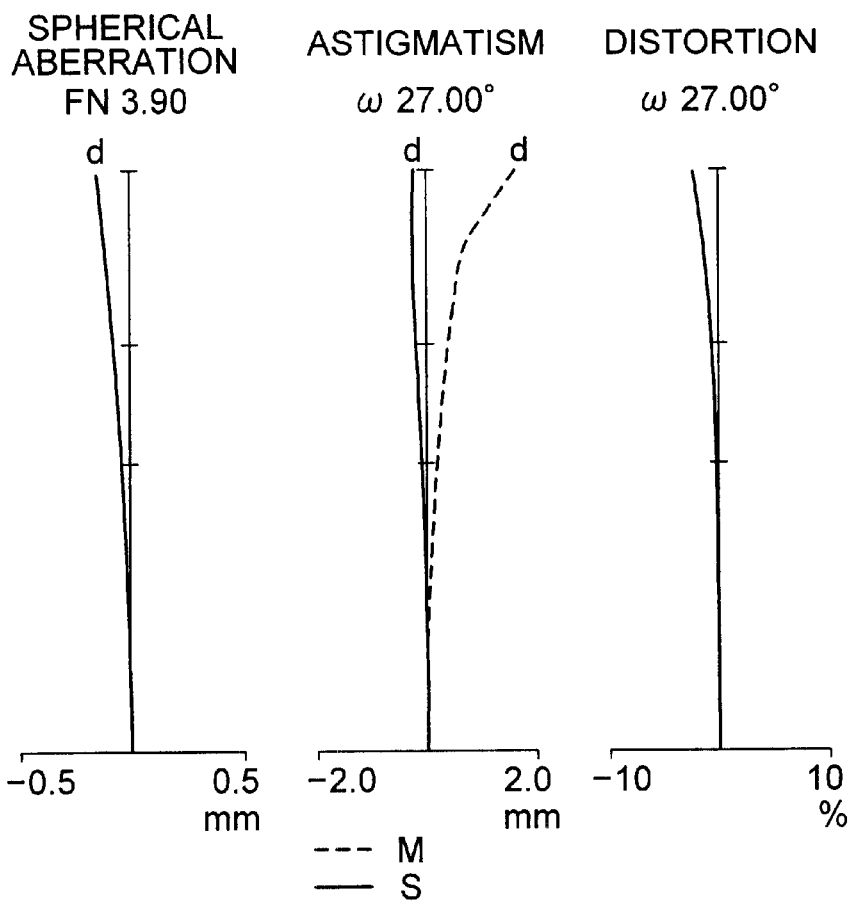
FIG. 8 is an aberration view of Example 4 of the present invention.
Figure 9:
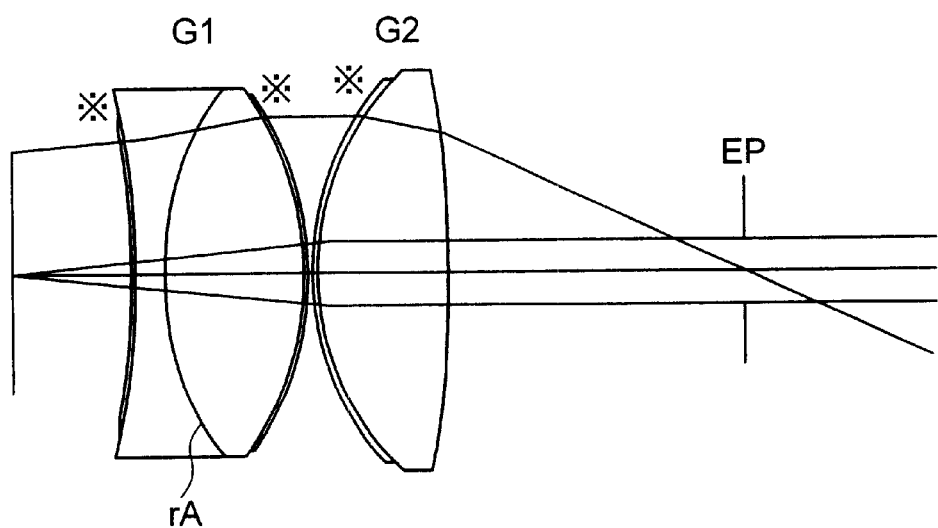
FIG. 9 is a view for showing the configuration of Example 5 of the present invention.
Figure 10:
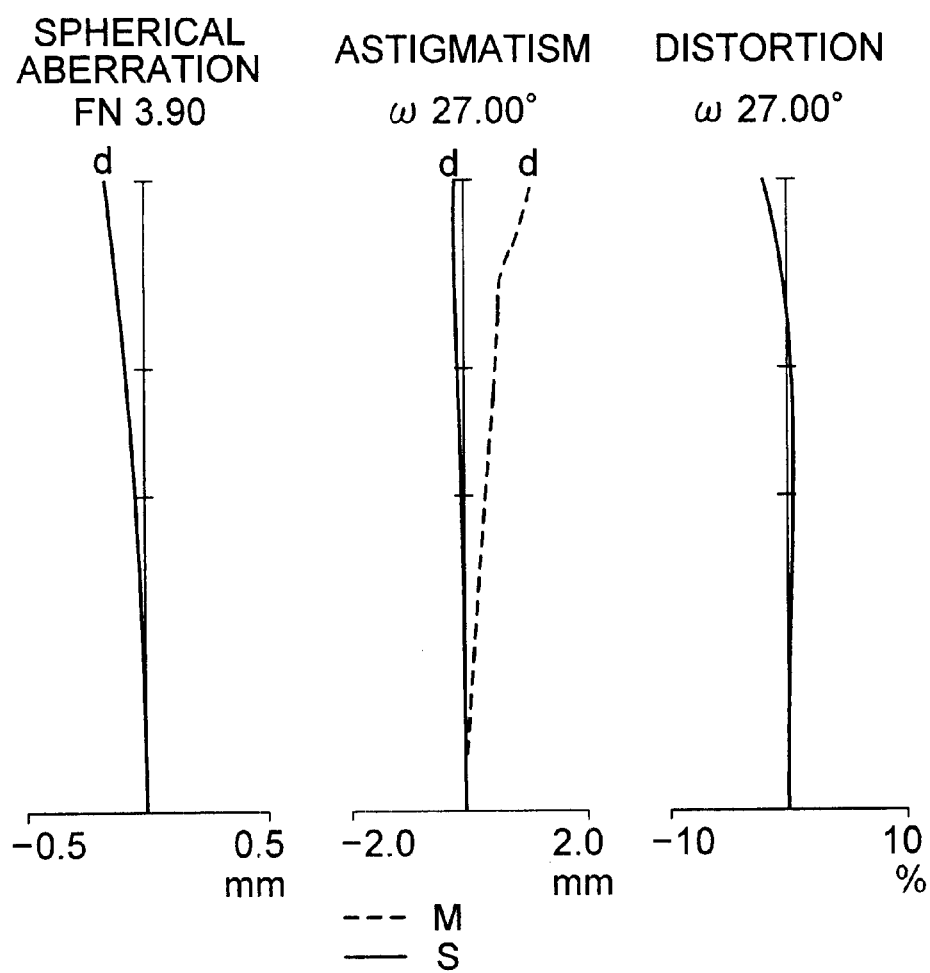
FIG. 10 is an aberration view of Example 5 of the present invention.

An eyepiece lens system is a lens system for observing an image of an object to be observed by the eye of an observer. In this case, for observing the real image of the object, the eyepiece lens system has a positive lens in order to enter a light flux emitted from the object or an image of the object into the eye of the observer as an observable one in a predetermined size. Also, the eyepiece lens system is required to have a cemented lens in order to effectively correct a lateral chromatic aberration, an astigmatism, and a distortion. Then, in addition to the above, the eyepiece lens system is required to have an aspherical surface to be introduced at least as one of the lens surfaces thereof in order to effectively correct the distortion, in particularly. In this case, in order to avoid an increase in the processing cost and to secure the freedom in optical designing at the same time, in spite of the introduction of the aspherical surface, this aspherical surface is required to be a hybrid type aspherical surface which is formed by applying a synthetic resin layer on a basic spherical surface of glass.

In this case, it is also possible to form the aspherical surface without generating a large difference in thickness between the central part and the circumference of the synthetic resin layer by forming the basic lens surface of glass itself in an aspherical form in advance and then by applying a layer of synthetic resin on the surface of this basic lens surface. However, a conspicuous increase of the cost arises since the basic lens surface of glass itself is formed in an aspherical form. As a result, it is required to form the basic lens surface of glass in a spherical form.

As a synthetic resin for forming the hybrid type aspherical surface, two types of resins including thermosetting resin and ultraviolet curing type resin can be generally considered. However, when a thermosetting resin is used, the stress is generated on the cemented surface due to the heat generated for curing, so that the aspherical surface is difficult to be processed into the cemented lens. Moreover, since the resin has to be once heated and then cooled, it requires a certain time to form the cemented lens, which results in a great increase of the cost. On the other hand, when an ultraviolet curing resin is used, the working time for cooling can be saved to reduce the producing cost conspicuously.

In addition, when the thermosetting resin is used, the resin layer is required to be thick so as to be easily affected by a fluctuation in temperature or humidity, compared with the case when the ultraviolet curing resin is used, with which the resin layer can be formed thin.

Taking the circumstances described above into consideration, it is desirable to use an ultraviolet curing type resin as the synthetic resin for forming the hybrid type aspherical surface.

Next, according to the present invention, it is preferable that at least one aspherical surface takes such a form in which the refractive power thereof changes in the negative direction from the vertex of the aspherical surface toward the circumference thereof, compared with a generating spherical surface which is formed based on the radius of curvature of the vertex of the aspherical surface.

By forming the aspherical surface of the aspherical lens of the present invention in such a shape so as to reduce the prism effect in the circumference of the lens surface of the aspherical lens, it is possible to correct a distortion while excellently correcting the aberrations even in the circumference of the wider field of view.

Moreover, in order to facilitate molding of the aspherical form, it is preferable to obtain the resin layer having the fixed thickness as far as possible. In this case, however, if the form of the basic spherical surface is to be aligned with the generating spherical surface based on the radius of curvature of the vertex of the aspherical surface, great restriction is imposed when the form of the aspherical surface is defined. In order to avoid such problem, it is preferable that the radius of curvature of the basic spherical surface of glass is made not to be aligned with the radius of curvature of the vertex of the aspherical surface intentionally so that the thickness of the resin layer is fixed as much as possible.

Then, the synthetic resin layer of the hybrid type aspherical surface which is formed of compound material of glass and synthetic resin for forming the aspherical form preferably satisfies the following condition:

$$tmax/tmin \leq 10 \qquad (1),$$

where tmax is the maximum resin thickness (within the sffective aperture), and tmin is the minimum resin thickness (within the sffective aperture).

The above condition (1) provides a condition for attaining an excellent molding performance of the synthetic resin layer for forming the aspherical form. If a value of the condition (1) exceeds the upper limit value, a large difference is generated for the resin thickness between the respective positions so that it may be difficult to mold the aspherical surface into a predetermined form. The value of the condition (1) is preferably not more than 5.

After satisfying the above condition (1), the thickness of the resin layer preferably satisfies the following condition (2), regardless of the size of the glass lens for forming the basic spherical surface.

$$tmax < 0.35 \text{ mm} \qquad (2).$$

By satisfying this condition (2), it becomes possible to reduce an amount of the resin which is required for forming the aspherical form. Thus, it is further possible to reduce the degree of deformation of the aspherical form which may be caused by a change in temperature or humidity.

Next, in the eyepiece lens system of the present invention, in order to effectively correct the distortion in particular with a smaller number of aspherical surfaces, it is preferable that at least one of the aspherical surfaces takes a form in which the refractive power thereof changes in the negative direction with respect to the generating spherical surface based on the radius of curvature of the vertex of the aspherical surface from the optical axis toward the circumference.

Figure 11:
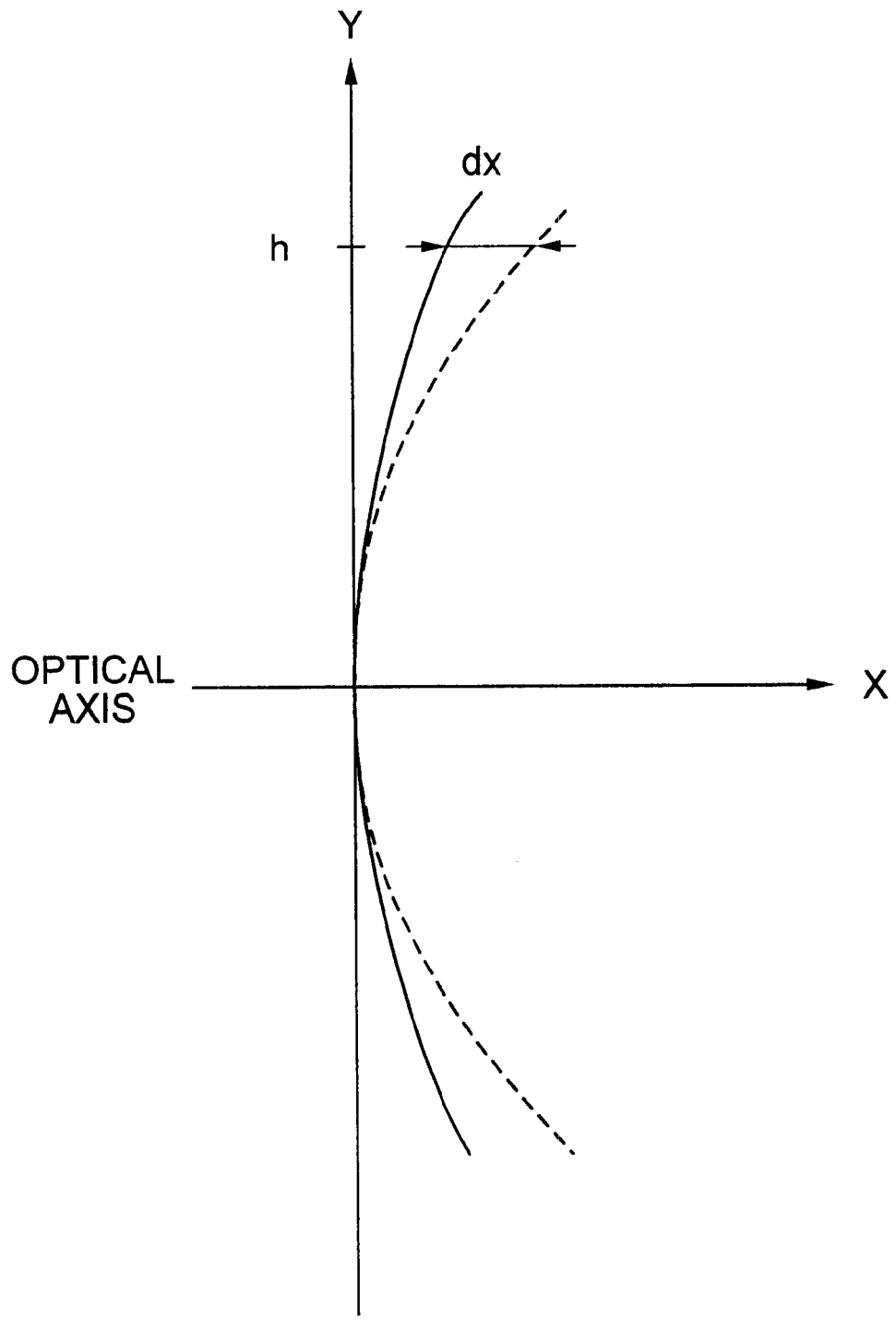
FIG. 11 is a conceptual diagram for showing an aspherical form of the present invention.

Furthermore, in the eyepiece lens system of the present invention, it is preferable that at least one of the aspherical surfaces satisfies the following condition (3):

$$0.001 \leq |dx/h| \leq 0.14 \qquad (3),$$

where h: the height of the principal ray having the maximum angle of view and passing an eye point from the optical axis at an entrance position with respect to the hybrid type aspherical surface (FIG. 11); and dx: the distance at the height h from said optical axis along the optical axis between the generating spherical surface based on said radius of curvature of the vertex of the hybrid type aspherical surface and the hybrid type aspherical surface (FIG. 11).

In this case, FIG. 11 is a conceptual view for showing the aspherical form in the eyepiece lens system of the present invention. In FIG. 11, the solid line defines the form of the hybrid type aspherical surface, and the dotted line defines the form of the generating spherical surface based on the radius of curvature of the vertex of the hybrid type aspherical surface.

The condition (3) defines the form of an aspherical surface. When at least one of the aspherical surfaces takes a form satisfying this condition (3), it is possible to conduct excellent correction of aberrations, including distortion in particular, up to the circumference of the field of view, in an eyepiece lens having a long eye relief and a wide apparent.

When the value of the condition (3) is below the lower limit value, it tends to become difficult to excellently correct the aberrations in the circumference of the field of view while maintaining the long eye relief and the wide apparent and to sufficiently conduct correction of the distortion. Also, when the value of the condition (3) exceeds the upper limit value, the effect generated by the aspherical surface becomes excessively strong, so as to bring about surplus correction of the distortion. In addition, it tends to become difficult to conduct excellent correction of the aberrations in the circumference of the field of view.

In this case, when the lower limit value for the condition (3) is 0.003 and the upper limit value is 0.1, it becomes possible to conduct the correction of the distortion further excellently.

Generally, in an eyepiece lens system, since a light flux required for image formation is small, the light scattering caused by a lens surface easily affects the image quality.

Thus, it is desirable that the number of lenses for constituting the eyepiece lens system is as small as possible. Accordingly, in order to reduce the number of the lenses and to excellently correct the aberrations particularly including distortion, it is preferable to constitute the eyepiece lens system with a first lens group which includes a cemented lens composed of a negative lens and a positive lens arranged from the side of an image to be observed in this order and having a convex surface facing the observer side, and a second lens group which consists of a positive single lens with the convex surface facing the side of the image to be observed.

Then, in the above arrangement, it is further desirable to satisfy the following condition (4):

$$0.75 \leq |rA/f| \leq 1.85 \quad (4),$$

where rA is the radius of curvature of the cemented surface of the first lens group G1, and f is the focal length of the entire eyepiece lens system.

The above condition (4) is to correct in excellent balance the aberrations such as astigmatism, curvature of field, distortion and lateral chromatic aberration.

If the value of the condition (4) is below the lower limit value, astigmatism is greatly generated unfavorably. On the contrary, if the value of the condition (4) exceeds the upper limit value, distortion is greatly generated, which can not be corrected by the aspherical surface unfavorably.

The cemented surface of the cemented lens for constituting the first lens group is contributive also to the correction of lateral chromatic aberration. It becomes possible to correct the lateral chromatic aberration satisfactorily by satisfying the condition (4).

It should be noted that the lower limit value for the condition (4) is set at 0.82 and the upper limit value is at 1.6, the aberrations can be corrected further with excellent balance.

Then, the following condition (5) defines a refractive index of the second lens group G2.

$$nG2 < 1.6 \quad (5),$$

where nG2 is the refractive index of the d line of the positive single lens for constituting the second lens group G2.

There is a general tendency that when a glass used for the lens has a higher refractive index, the cost of the material becomes higher.

when the glass used for the second lens group G2 has a higher refractive index, it is more advantageous for correcting distortion. However, in the present invention, the distortion can be satisfactorily corrected in spite of a glass having a low refractive index which is used for this lens since the aspherical surface is employed. Thus, it is possible to suppress the cost of material by using the glass with a lower refractive index.

Consequently, the cost of material can be suppressed by satisfying the condition (5).

Furthermore, the following conditions (6) and (7) are conditions for obtaining a glass lens form which is suitable for producing an eyepiece hybrid type aspherical surface of the present invention:

$$-0.7 \, mm \leq |SX| - |AX| \leq 0.2 \, mm \quad (6),$$

and $$-0.2 \, mm \leq |SX| - |AX| \leq 0.7 \, mm \quad (7)$$

where

SX: the distance between the basic spherical surface formed by the glass of the hybrid type aspherical surface and the tangent plane at the vertex on the optical axis of the hybrid type aspherical surface at the height h from the optical axis; and AX: the distance between the generating spherical surface formed by the radius of curvature of the vertex of the hybrid type aspherical surface and the tangent plane at the vertex on the optical axis of the hybrid type aspherical surface at the height h from the optical axis.

Figure 12:
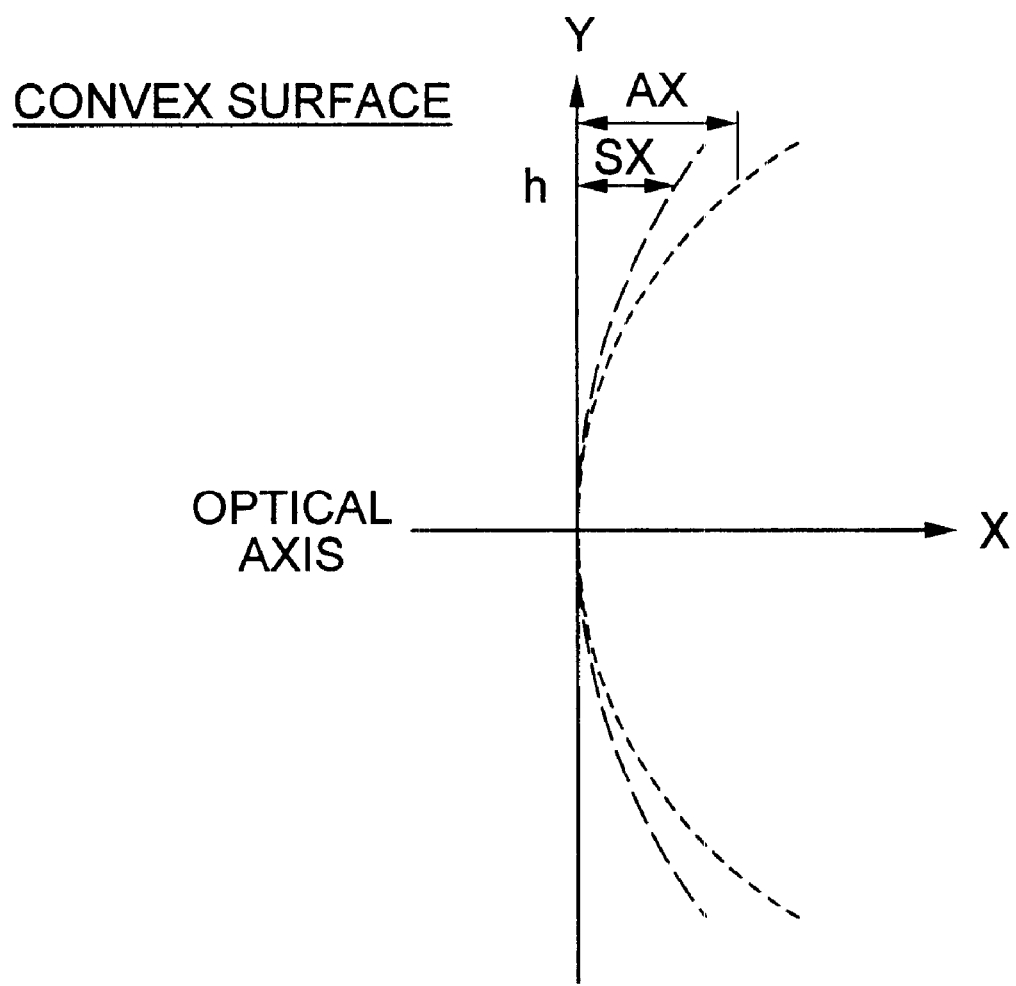
FIG. 12 is a conceptual diagram for explaining the condition (7) of the present invention.
Figure 13:
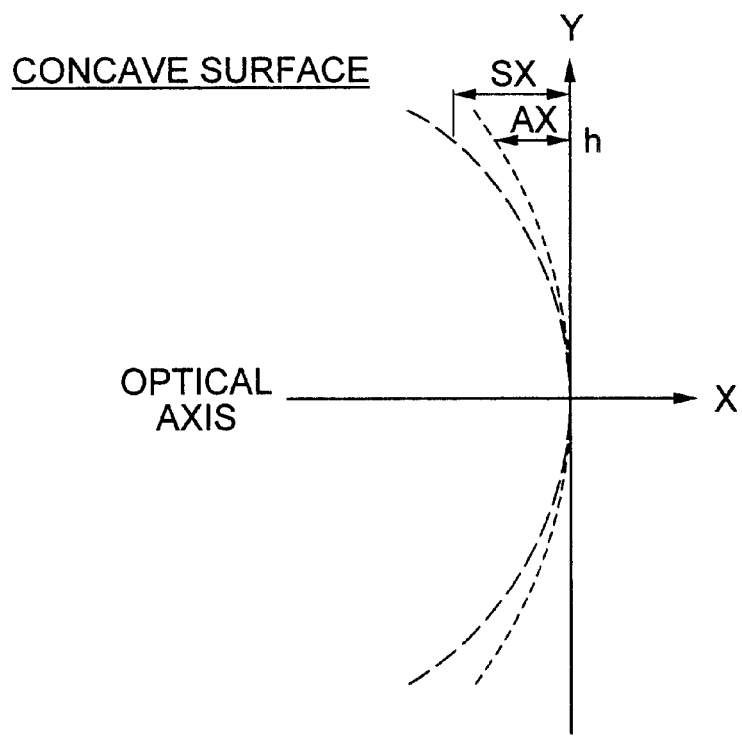
FIG. 13 is a conceptual diagram for explaining the condition (8) of the present invention.

The condition (6) is a condition when the refractive power of the hybrid type aspherical surface is positive (FIG. 12), while the condition (7) is a condition when the refractive power of the hybrid type aspherical surface is negative (FIG. 13).

Here, FIGS. 12 and 13 are conceptual views for explaining the conditions (6) and (7) above, in which the chain line defines the form of the basic spherical surface formed by the glass of the hybrid type aspherical surface, while the dotted line defines the form of the generating spherical surface which is formed by the radius of curvature of the vertex of the hybrid type aspherical surface.

Irrespective of the size of the aspherical lens itself, when the above conditions are satisfied, it is possible to suppress to the minimum a difference between the maximum resin thickness and the minimum resin thickness of the resin layer on the hybrid type aspherical surface.

When the refractive power of the hybrid type aspherical surface is positive, if the value of the condition (6) is below the lower limit value, the thickness of the resin layer in the circumference thereof is too small, so that it is inevitable to increase the thickness of the resin layer in the central portion to compensate this. As a result, a difference in thickness of the resin layer becomes unfavorably great between the central portion and the circumference. On the contrary, when the value of the condition (6) exceeds the upper limit value, the thickness of the resin layer in the circumference thereof becomes too great unfavorably.

Particularly, in the condition (6), if the lower limit value is −0.4 and the upper limit value is 0, the thickness of the resin layer can be set more satisfactorily.

When the refractive power of the hybrid type aspherical surface is negative, if a value of the condition (7) is below the lower limit value, the thickness of the resin layer in the circumference becomes too great unfavorably. On the contrary, if the value of the condition (7) exceeds the upper limit value, the thickness of the resin layer in the circumference becomes too small so that it is required to increase the thickness of the resin layer in the central portion to compensate this. As a result, a difference in the thickness of the resin layer becomes unfavorably great between the central portion and the circumference. Particularly, in the condition (7), if the lower limit value is 0 and the upper limit value is 0.4, the thickness of the resin layer can be set more satisfactorily.

EXAMPLES

Examples of the present invention will be described in the following.

Each example is composed of a first lens group G1 and a second lens group G2. The first lens group G1 comprises a negative lens and a positive lens cemented together and disposed from an object side in this order and of which the surface closest to the observer is convex toward the observer side, while the second lens group G2 consists of a positive single lens whose surface facing the object is convex toward the object. At least one lens surface out of these lens groups is formed to be aspherical.

FIGS. 1, 3, 5, 7 and 9 are diagrams for respectively showing the configurations of Examples 1 to 5 in order. In these diagrams, EP denotes an eye point, a surface with asterisk ※ denotes an aspherical surface.

Specifications of Examples 1 to 5 are shown in the Tables 1 to 5.

In each of the tables, No denotes a lens surface number, R the radius of curvature of a lens surface, d a distance between lens surfaces, nd a refractive index with respect to the d line, ν d an Abbe's number with respect to the d line, f the focal length of the entire lens system, and I the length of an eye relief.

A lens surface having a lens surface number with asterisk ⁕ denotes a lens surface having an aspherical form, while the radius of curvature R on an aspherical lens surface denotes the radius of curvature of the vertex of the aspherical surface.

In addition, any aspherical surface in the examples of the present invention is a rotation-symmetrical aspherical surface represented by the following expression:

$$X = C_0Y^2/(1+(1-kC_0^2Y^2)^{1/2}) + C_4Y^4 + C_6Y^6 + C_8Y^8 + C_{10}Y^{10},$$

where

X: the distance measured from the vertex of the aspherical surface along the optical axis;

Y: the height passing through the vertex of the aspherical surface from the optical axis;

k: the conical constant;

$C_0$: $1/R$ (R=the radius of curvature of the vertex of the aspherical surface);

$C_2$: an aspherical coefficient of second order;

$C_4$: an aspherical coefficient of fourth order;

$C_6$: an aspherical coefficient of sixth order;

$C_8$: an aspherical coefficient of eighth order; and $C_{10}$: an aspherical coefficient of tenth order.

TABLE 1

Example 1 f = 14.0
I = 15.0

| No | R | d | nd | νd |
|---|---|---|---|---|
| ⁕1 | −120.0 | 0.1 | 1.552 | 38.5 |
| 2 | −60.0 | 1.5 | 1.805 | 25.4 |
| 3 | 14.9 | 8.5 | 1.589 | 61.1 |
| 4 | −14.9 | 0.2 | | |
| 5 | 16.5 | 5.2 | 1.589 | 61.1 |
| 6 | −56.7 | | | |

Aspherical coefficient: the first plane

K = 0.00  $C_2 = 0.00$  $C_4 = -1.67 \times 10^{-4}$
$C_6 = 1.63 \times 10^{-6}$  $C_8 = 0.00$
$C_{10} = -3.82 \times 10^{-11}$ Values corresponding to the condition:

|rA/f| = 1.06  nG2 = 1.589
|dx/h| = 0.033  |SX| − |AX| = 0.217 (concave)
tmax/tmin = 1.71  tmax = 0.12

TABLE 2

Example 2 f = 14.0
I = 15.0

| No | R | d | nd | νd |
|---|---|---|---|---|
| 1 | −140.1 | 1.5 | 1.805 | 25.4 |
| 2 | 12.6 | 11.0 | 1.652 | 58.5 |
| 3 | −17.4 | 0.1 | 1.552 | 38.5 |
| ⁕4 | −17.3 | 0.2 | | |
| 5 | 15.3 | 4.8 | 1.589 | 61.1 |
| 6 | −145.5 | | | |

Aspherical coefficient: the fourth plane

K = 0.30  $C_2 = 0.00$  $C_4 = 1.35 \times 10^{-5}$
$C_6 = -2.03 \times 10^{-7}$  $C_8 = 5.80 \times 10^{-10}$
$C_{10} = 4.69 \times 10^{-12}$ Values corresponding to the condition:

|rA/f| = 0.90  nG2 = 1.589
|dx/h| = 0.015  |SX| − |AX| = −0.022 (convex)
tmax/tmin = 2.0  tmax = 0.2

TABLE 3

Example 3 f = 14.0
I = 15.0

| No | R | d | nd | νd |
|---|---|---|---|---|
| 1 | −75.5 | 1.5 | 1.805 | 25.4 |
| 2 | 13.6 | 7.7 | 1.589 | 61.1 |
| 3 | −18.7 | 0.2 | | |
| ⁕4 | 13.7 | 0.09 | 1.552 | 38.5 |
| 5 | 14.5 | 7.9 | 1.589 | 61.1 |
| 6 | −36.8 | | | |

Aspherical coefficient: the fourth plane

K = 0.02  $C_2 = 0.00$  $C_4 = -6.00 \times 10^{-6}$
$C_6 = 0.00$  $C_8 = -2.65 \times 10^{-10}$
$C_{10} = 5.53 \times 10^{-13}$ Values corresponding to the condition:

|rA/f| = 0.97  nG2 = 1.589
|dx/h| = 0.046  |SX| − |AX| = −0.23 (convex)
tmax/tmin = 3.86  tmax = 0.27

TABLE 4

Example 4 f = 14.0
I = 15.0

| No | R | d | nd | νd |
|---|---|---|---|---|
| ⁕1 | −46.0 | 0.1 | 1.552 | 38.5 |
| 2 | −45.0 | 1.5 | 1.805 | 25.4 |
| 3 | 16.0 | 7.5 | 1.589 | 61.1 |
| 4 | −16.0 | 0.2 | | |
| ⁕5 | 13.7 | 0.07 | 1.552 | 38.5 |
| 6 | 14.0 | 7.3 | 1.589 | 61.1 |
| 7 | −52.0 | | | |

Aspherical coefficient:

the first plane:

K = 25.3  $C_2 = 0.00$  $C_4 = -4.70 \times 10^{-6}$
$C_6 = 4.20 \times 10^{-7}$  $C_8 = 0.00$
$C_{10} = 7.30 \times 10^{-11}$ the fifth plane:

K = −0.12  $C_2 = 0.00$  $C_4 = 1.00 \times 10^{-5}$
$C_6 = 3.90 \times 10^{-8}$  $C_8 = -1.80 \times 10^{-10}$
$C_{10} = -6.10 \times 10^{-13}$ TABLE 4-continued Example 4

Values corresponding to the condition:

|rA/f| = 1.14     nG2 = 1.589
the first plane:

|dx/h| = 0.008    |SX| − |AX| = −0.013 (concave)
tmax/tmin = 1.5   tmax = 0.15
the fifth plane:

|dx/h| = 0.035    |SX| − |AX| = −0.083 (convex)
tmax/tmin = 4.1   tmax = 0.29

TABLE 5

Example 5 f = 14.0
I = 15.2

| No | R | d | nd | vd |
|---|---|---|---|---|
| ✻1 | −42.0 | 0.1 | 1.552 | 38.5 |
| 2 | −40.0 | 1.5 | 1.805 | 25.4 |
| 3 | 16.3 | 7.3 | 1.589 | 61.1 |
| 4 | −16.3 | 0.1 | 1.552 | 38.5 |
| ✻5 | −16.3 | 0.2 | | |
| ✻6 | 13.0 | 0.12 | 1.552 | 38.5 |
| 7 | 14.0 | 7.1 | 1.589 | 61.1 |
| 8 | −56.8 | | | |

Aspherical coefficient:

the first plane:

K = 15.00     $C_2 = 0.00$           $C_4 = -4.65 \times 10^{-6}$
              $C_6 = 4.25 \times 10^{-7}$   $C_8 = 0.00$
              $C_{10} = 8.84 \times 10^{-11}$ the fifth plane:

K = 0.80      $C_2 = 0.00$    $C_4 = 0.00$
              $C_6 = 0.00$    $C_8 = 0.00$
              $C_{10} = 0.00$ the sixth plane:

K = −0.25     $C_2 = 0.00$               $C_4 = 1.11 \times 10^{-5}$
              $C_6 = 9.23 \times 10^{-8}$    $C_8 = -1.81 \times 10^{-10}$
              $C_{10} = -5.18 \times 10^{-12}$ Values corresponding to the condition:

|rA/f| = 1.16    nG2 = 1.589
the first plane:

|dx/h| = 0.0009   |SX| − |AX| = 0.031 (concave)
tmax/tmin = 1.25  tmax = 0.1
the fifth plane:

|dx/h| = 0.0043   |SX| − |AX| = 0.0 (convex)
tmax/tmin = 1.4   tmax = 0.14
the sixth plane:

|dx/h| = 0.043    |SX| − |AX| = −0.278 (convex)
tmax/tmin = 2.5   tmax = 0.2

Furthermore, FIGS. 2, 4, 6, 8 and 10 are aberration views for respectively showing spherical aberration, astigmatism and distortion in Examples 1 to 5 in order.

Each of the aberration views shows aberration in image formation when a light beam enters from the eye point side. In each view of astigmatism, the solid line denotes a sagittal image surface and the broken line denotes a meridional image surface. Also, in each of the views, Fno represents the F-number of the eyepiece lens system, and ω a half angle of view of an apparent of the eyepiece lens system.

From these aberration views, it is clearly seen that the aberrations, especially curvature of field, astigmatism and distortion, are satisfactorily corrected in all of Examples 1 to 5.

Figure 14:
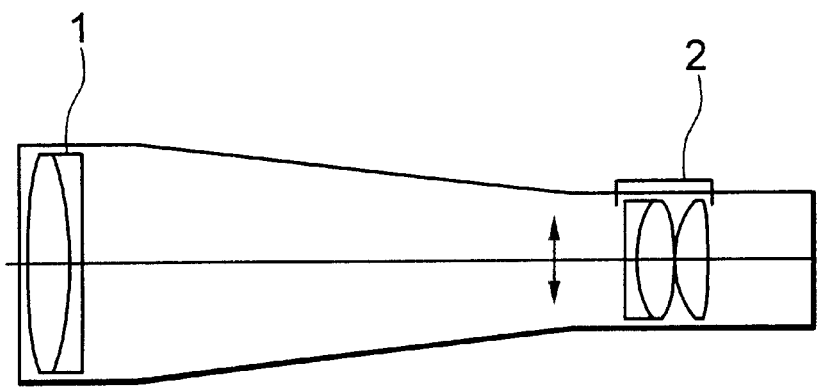
FIG. 14 is a view for showing the configuration of Example 6 of the present invention.

Next, FIG. 14 shows the configuration of a telescope which employs the eyepiece lens system of the present invention as Example 6. The telescope in Example 6 is an astronomical telescope, and is arranged to observe by means of an eyepiece lens system 2 an image of an object which is formed by an objective lens system 1.

Figure 15:
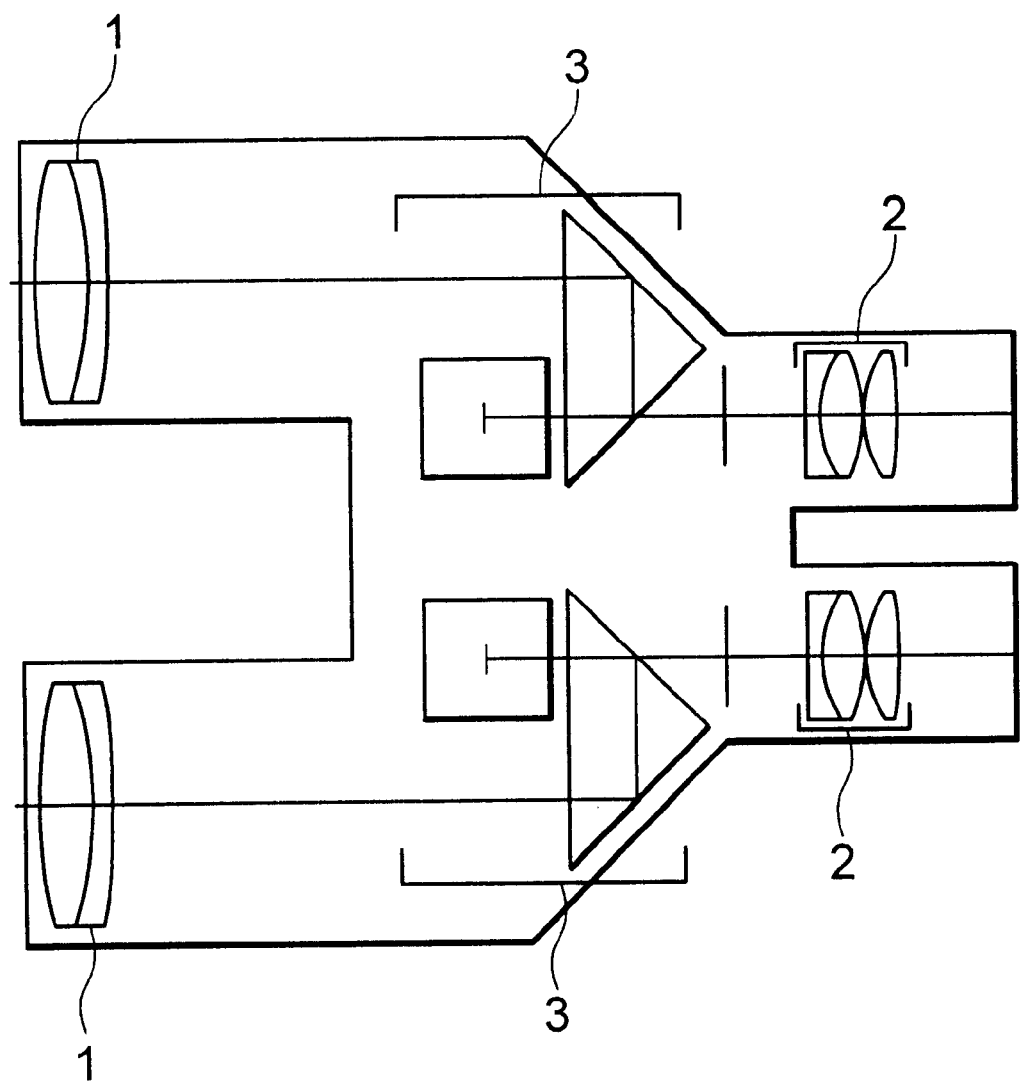
FIG. 15 is a view for showing the configuration of Example 7 of the present invention.

FIG. 15 shows the configuration of a binocular which employs the eyepiece lens system of the present invention as Example 7. The binocular in Example 7 is arranged to observe by means of the eyepiece lens system 2 an erect image of an object which is formed by the objective lens system 1 and an erect prism 3.

Figure 16:
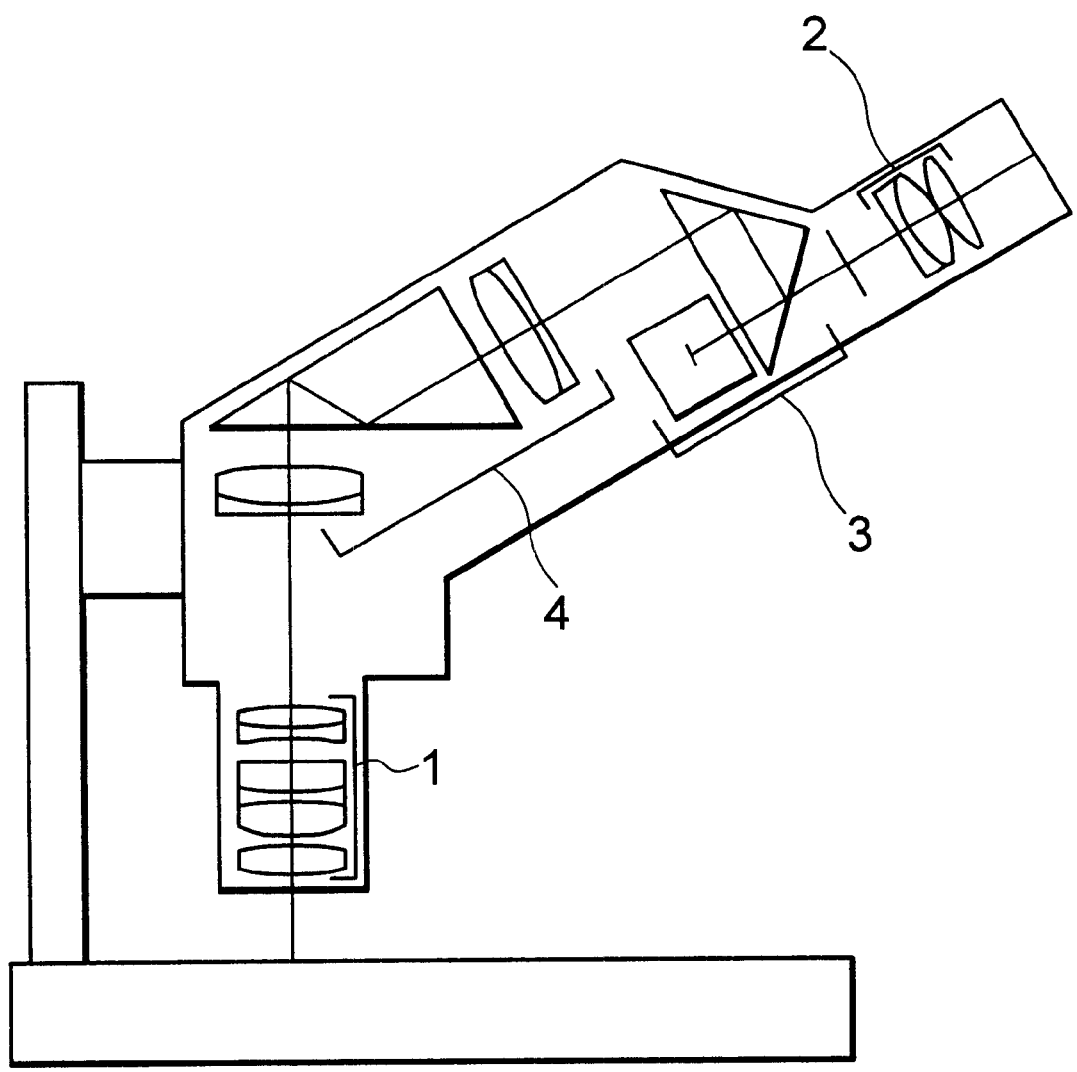
FIG. 16 is a view for showing the configuration of Example 8 of the present invention.

Furthermore, FIG. 16 shows the configuration of a microscope which employs the eyepiece lens system of the present invention as Example 8. The microscope in Example 8 is arranged to observe by means of the eyepiece lens system 2 an image of an object which is formed by the objective lens system 1, a relay lens system 4 and the erect prism 3.

In these Examples 6 to 8, it is rendered possible to observe an object as an excellent image having less astigmatism and distortion by the use of the eyepiece lens system of the present invention.

As described above, according to the present invention, it is possible to obtain an eyepiece lens system which has a wide apparent and an eye relief equivalent to 80% or more of the focal length of the entire eyepiece lens system, with satisfactorily corrected aberrations, especially including distortion. It is also possible to provide a telescope, a binocular and a microscope capable of observing an object as an excellent image by the use of this eyepiece lens system.

What is claimed is:

1. An eyepiece lens system, comprising a first lens group with a cemented lens and a second lens group with a positive lens, and in which at least one of the lens surfaces is formed aspherical, the aspherical surface being a compound aspherical surface, which is formed by applying a layer of synthetic resin on a basic spherical surface of glass, wherein on at least one of the compound aspherical surfaces, the basic spherical surface and a generating spherical surface based on the radius of curvature of the vertex of the compound aspherical surface have different radiuses of curvature from each other.

2. An eyepiece lens system according to claim 1, wherein the synthetic resin layer of the compound aspherical surface satisfies the following expressions:

$$tmax/tmin \leq 10;$$

and $$tmax < 0.35 \text{ mm},$$

where tmax: the maximum resin thickness within the effective diameter range of the compound aspherical surface; and tmin: the minimum resin thickness within effective diameter range of the compound aspherical surface.

3. An eyepiece lens system according to claim 1, wherein at least one of the compound aspherical surfaces takes a form in which the refractive power thereof changes in the negative direction from the optical axis toward the circumference with respect to a generating spherical surface based on the radius of curvature of the vertex on the optical axis.

4. An eyepiece lens system according to claim 1, wherein the cemented lens of the first lens group has a negative lens and a positive lens in this order from the side of an image to be observed and the first lens group has a convex surface facing the observer side, and the positive lens of the second lens group has a single positive lens and a convex surface facing the side of the image to be observed.

5. An eyepiece lens system according to claim 1, wherein the following expression is satisfied:

$$0.75 \leq |rA/f| \leq 1.85,$$

where rA: the radius of curvature of the cemented surface of the first lens group; and f: the focal length of the entire eyepiece lens system.

6. A telescope characterized by employing the eyepiece lens system according to claim 1.

7. A binocular characterized by employing the eyepiece lens system according to claim 1.

8. A microscope characterized by employing the eyepiece lens system according to claim 1.

9. An eyepiece lens system, comprising a first lens group with a cemented lens and a second lens group with a positive lens, and in which at least one of the lens surfaces is formed aspherical, the aspherical surface being a compound aspherical surface, which is formed by applying a layer of synthetic resin on a basic spherical surface of glass, wherein the synthetic resin for forming the compound aspherical surface is an ultraviolet curing resin and wherein on at least one of the compound aspherical surfaces, the basic spherical surface and a generating spherical surface based on the radius of curvature of the vertex of the compound aspherical surface have different radiuses of curvature from each other.

10. An eyepiece lens system according to claim 9, wherein the synthetic resin layer of the compound aspherical surface satisfies the following expressions:

$$tmax/tmin \leq 10; \text{ and}$$

$$tmax \leq 0.35 \text{ mm,}$$

where tmax: the maximum resin thickness within the effective diameter range of the compound aspherical surface; and tmin: the minimum resin thickness within the effective diameter range of the compound aspherical surface.

11. An eyepiece lens system according to claim 9, wherein at least one of the compound aspherical surfaces takes a form in which the refractive power thereof changes in the negative direction from the optical axis toward the circumference with respect to a generating spherical surface based on the radius of curvature of the vertex on the optical axis.

12. An eyepiece lens system according to claim 9, wherein the cemented lens of the first lens group has a negative lens and a positive lens in this order from the side of an image to be observed and the first lens group has a convex surface facing the observer side, and the positive lens of the second lens group has a single positive lens and a convex surface facing the side of the image to be observed.

13. An eyepiece lens system according to claim 9, wherein the following expression is satisfied:

$$0.75 \leq |rA/f| 1.85,$$

where rA: the radius of curvature of the cemented surface of the first lens group; and f: the focal length of the entire eyepiece lens system.

14. A telescope characterized by employing the eyepiece lens system according to claim 9.

15. A binocular characterized by employing the eyepiece lens system according to claim 9.

16. A microscope characterized by employing the eyepiece lens system according to claim 9.

17. An eyepiece lens system, comprising a first lens group with a cemented lens and a second lens group with a positive lens, and in which at least one of the lens surfaces is formed aspherical, the aspherical surface being a compound aspherical surface, which is formed by applying a layer of synthetic resin on a basic spherical surface of glass, wherein at least one of the aspherical forms of the eyepiece lens satisfies the following expression:

$$0.0011 \leq |dx/h| \leq 0.14,$$

where h: the height of the chief ray having the maximum angle of view and passing an eye point, from the optical axis at an entrance position with respect to the compound aspherical surface; and dx: the distance at the height h from the optical axis along the optical axis of the spherical surface based on said radius of curvature of the vertex and said aspherical surface.

18. An eyepiece lens system, comprising a first lens group with a cemented lens and a second lens group with a positive lens, and in which at least one of the lens surfaces is formed aspherical, the aspherical surface being a compound aspherical surface, which is formed by applying a layer of synthetic resin on a basic spherical surface of glass, wherein the synthetic resin for forming the compound aspherical surface is an ultraviolet curing resin, and wherein at least one of the aspherical forms of the eyepiece lens satisfies the following expression:

$$0.001 \leq |dx/h| 0.14,$$

where h: the height of the chief ray having the maximum angle of view and passing an eye point, from the optical axis at an entrance position with respect to the compound aspherical surface; and dx: the distance at the height h from the optical axis along the optical axis of the spherical surface based on said radius of curvature of the vertex and said aspherical surface.

* * * * *